(12) United States Patent
Mulazzani

(10) Patent No.: US 11,181,025 B2
(45) Date of Patent: Nov. 23, 2021

(54) SCR DOSING UNIT FOR CONVEYING AND PROVIDING A LIQUID EXHAUST GAS PURIFICATION ADDITIVE

(71) Applicant: Vitesco Technologies GmbH, Hannover (DE)

(72) Inventor: Sandro Mulazzani, Schwalbach a. Ts. (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 16/770,298

(22) PCT Filed: Dec. 5, 2018

(86) PCT No.: PCT/EP2018/083566
§ 371 (c)(1),
(2) Date: Jun. 5, 2020

(87) PCT Pub. No.: WO2019/110629
PCT Pub. Date: Jun. 13, 2019

(65) Prior Publication Data
US 2021/0172360 A1    Jun. 10, 2021

(30) Foreign Application Priority Data

Dec. 8, 2017   (DE) ............. 10 2017 222 301.4

(51) Int. Cl.
*F01N 3/20* (2006.01)
*B01D 53/94* (2006.01)
*H05B 3/06* (2006.01)

(52) U.S. Cl.
CPC ....... *F01N 3/2066* (2013.01); *B01D 53/9431* (2013.01); *H05B 3/06* (2013.01);
(Continued)

(58) Field of Classification Search
CPC ........... F01N 3/2066; F01N 2610/1406; F01N 2610/1433; B01D 53/9431; H05B 3/06; H05B 2203/02
(Continued)

(56) References Cited

U.S. PATENT DOCUMENTS

| 2004/0040288 A1* | 3/2004 | Jacob ............... B01D 53/90 60/286 |
| 2004/0098980 A1* | 5/2004 | Montreuil ........ B01D 53/9431 60/295 |

(Continued)

FOREIGN PATENT DOCUMENTS

| CN | 104350249 | 2/2015 |
| CN | 106460609 | 2/2017 |

(Continued)

OTHER PUBLICATIONS

International Search Report issued in corresponding PCT Application PCT/EP2018/083566.

(Continued)

*Primary Examiner* — Tom P Duong
(74) *Attorney, Agent, or Firm* — Cozen O'Connor

(57) ABSTRACT

An SCR dosing pump assembly for conveying and providing a liquid exhaust gas purification additive includes: a plastic housing; a multi-part aluminum frame having first part and a second part; and at least one positive temperature coefficient (PTC) heating element configured as an electrically conductive contact between the first part and the second part of the aluminum frame. No further electrically conductive contacts exist between the first part and the second part of the aluminum frame. The multi-part aluminum frame is molded into the plastic housing of the SCR dosing pump assembly.

10 Claims, 3 Drawing Sheets

(52) U.S. Cl.
CPC .. *F01N 2610/10* (2013.01); *F01N 2610/1406* (2013.01); *F01N 2610/1433* (2013.01); *H05B 2203/02* (2013.01); *H05B 2203/021* (2013.01)

(58) Field of Classification Search
USPC .................................................. 60/274, 300
See application file for complete search history.

(56) References Cited

U.S. PATENT DOCUMENTS

| | | | | |
|---|---|---|---|---|
| 2010/0025408 A1* | 2/2010 | Haeberer | ............... | B60K 13/04 220/564 |
| 2013/0145749 A1* | 6/2013 | Merchant | .............. | F01N 3/2066 60/295 |
| 2014/0065022 A1* | 3/2014 | Overhoff | ................. | F01N 3/208 422/110 |
| 2015/0128573 A1* | 5/2015 | Fletcher | ................. | B60K 13/04 60/284 |
| 2015/0231565 A1* | 8/2015 | Wittrock | ................. | F01N 3/103 423/212 |
| 2016/0131005 A1* | 5/2016 | Bruck | ................... | F01N 3/2066 60/274 |
| 2016/0146082 A1* | 5/2016 | Hodgson | ............... | F01N 3/2066 60/300 |
| 2016/0186633 A1* | 6/2016 | Muller | ................... | B60K 13/04 60/295 |

FOREIGN PATENT DOCUMENTS

| | | |
|---|---|---|
| DE | 10 2011 006 105 | 9/2012 |
| DE | 10 2011 075 726 | 11/2012 |
| DE | 102012223087 | 6/2014 |
| DE | 10 2013 108 501 | 3/2015 |
| EP | 2 341 224 | 7/2011 |
| WO | WO 2014/198870 | 12/2014 |
| WO | WO 2016/001178 | 1/2016 |
| WO | WO 2017/077448 | 5/2017 |

OTHER PUBLICATIONS

Written Opinion issued in corresponding PCT Application PCT/EP2018/083566.
Office Action issued in corresponding German Application No. 10 2017 222 301.4.
Office Action dated May 26, 2021 issued in Chinese Patent Application No. 201880076726.X.

* cited by examiner

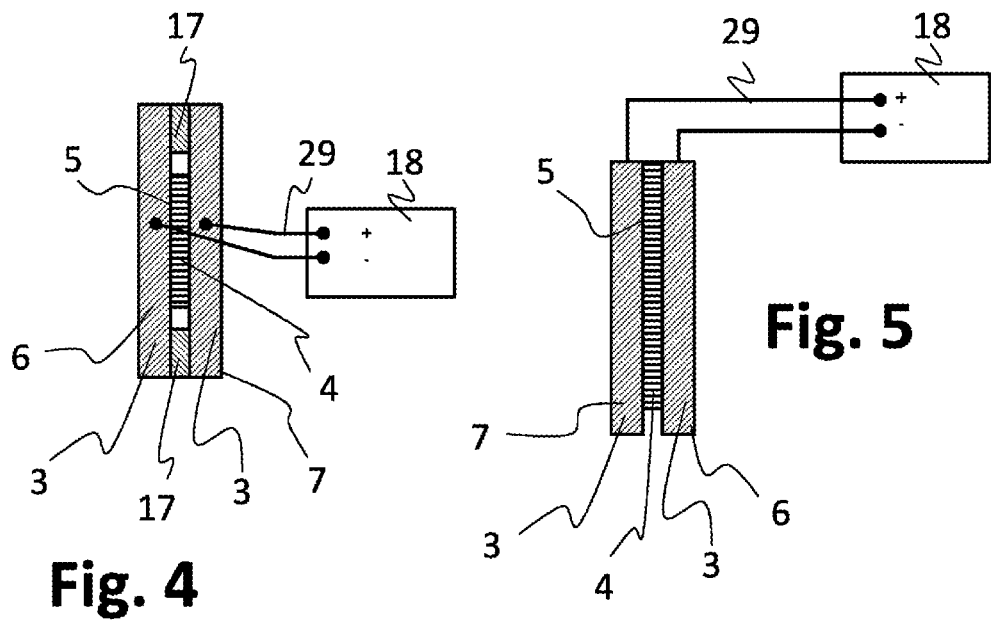
Fig. 4
Fig. 5
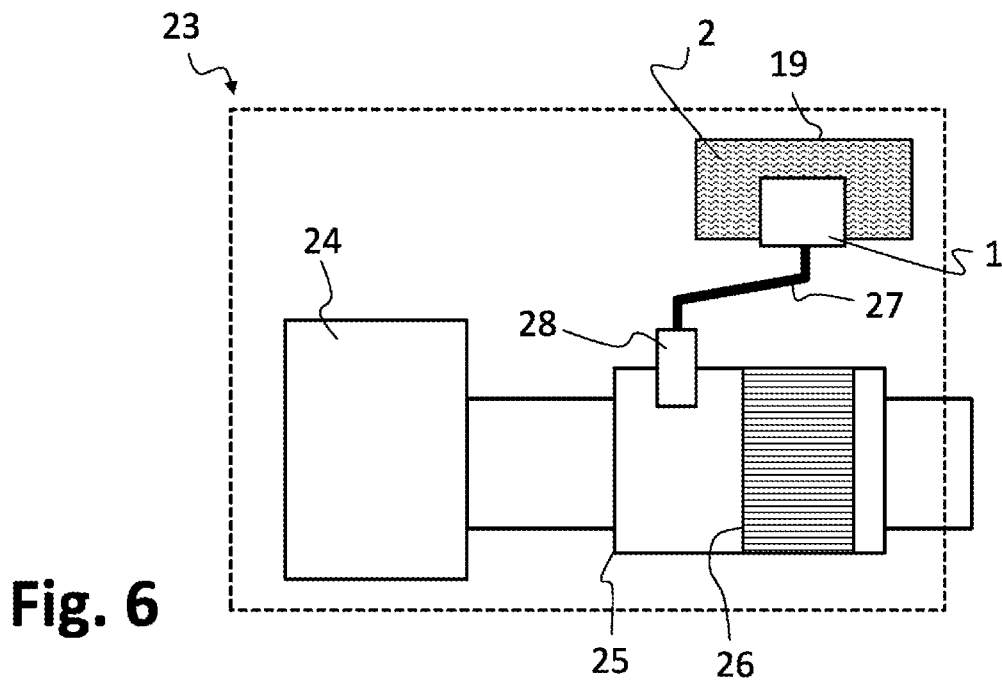
Fig. 6

SCR DOSING UNIT FOR CONVEYING AND PROVIDING A LIQUID EXHAUST GAS PURIFICATION ADDITIVE

CROSS REFERENCE TO RELATED APPLICATIONS

This is a U.S. national stage of International application No. PCT/EP2018/083566, filed on Dec. 5, 2018, which claims priority to German Application No. 10 2017 222 301.4, filed Dec. 8, 2017, the content of each of which is incorporated herein by reference.

BACKGROUND OF THE INVENTION

1. Field of the Invention

The invention relates to an SCR dosing unit (SCR dosing pump assembly) for conveying and providing a liquid exhaust gas purification additive. An SCR dosing unit of this kind can be used in a motor vehicle, for example, to convey an exhaust gas purification additive to the exhaust gas treatment device of the motor vehicle. This can be, for example, an exhaust gas treatment device which is used to clean the exhaust gas of a diesel internal combustion engine of the motor vehicle and in which the method of selective catalytic reduction (SCR) is applied.

2. Description of the Prior Art

The exhaust gases of diesel internal combustion engines often have a high proportion of nitrogen oxide compounds, which can be reduced by the SCR method, using an exhaust gas purification additive. As an exhaust gas purification additive, use is often made of a urea-water solution in this context. Urea-water solution with a urea content of 32.5% is available for exhaust gas purification under the trade name AdBlue®. Urea-water solution is converted into ammonia outside the exhaust gas or within the exhaust gas. The nitrogen oxide compounds in the exhaust gas in the exhaust gas treatment device then react in the SCR process to form harmless substances, in particular water, nitrogen and $CO_2$.

To convey and provide exhaust gas purification additive, there is usually a need in a motor vehicle for a tank in which exhaust gas purification additive is stored. Moreover, there is a need for an SCR dosing unit (i.e., pump assembly) which takes the exhaust gas purification additive from the tank and conveys it to the exhaust gas treatment device. In the storage of exhaust gas purification additive in the tank and in the conveying and provision of the exhaust gas purification additive, it is often problematic that the exhaust gas purification additives that are usually employed (e.g., the urea-water solution discussed above) can freeze at low temperatures. During freezing, there is, on the one hand, an expansion in volume, which leads to the possibility of the tank, the SCR dosing unit and other components being damaged. Moreover, delivery is not possible if the exhaust gas purification additive has frozen. For this reason, there is a known practice of providing heating systems in SCR dosing units and in tanks for storing exhaust gas purification additives. With such heating systems, it is possible, on the one hand, to prevent freezing of the exhaust gas purification additive. On the other hand, it is possible to thaw frozen exhaust gas purification additive, with the result that it becomes liquid and can then be made available again.

A type of heating system which is used particularly often with SCR dosing units is "PTC" heating elements. PTC heating elements (PTC=positive temperature coefficient) have the characteristic of being self-regulating around a particular temperature. This means that a particular heating temperature is established automatically during the operation of such PTC heating elements. PTC heating elements consist of special materials which have a temperature-dependent electric resistance that generates the dependence described of the heat output on the temperature.

However, PTC heating elements are relatively expensive. Moreover, it is difficult to heat large areas with PTC heating elements. There is therefore a known practice of using heat distribution structures in order to dissipate the heat generated by PTC heating elements in an effective manner from the PTC heating elements and to distribute it over relatively large areas. Only in this way is it possible to ensure effective thawing of relatively large quantities of frozen liquid exhaust gas purification additive in a tank. Heat distribution structures are generally formed from metals of good thermal conductivity, e.g., aluminum. Heat distribution structures and PTC heating elements are generally not permanently stable in the exhaust gas purification additive. Corrosion occurs very rapidly if PTC heating elements and heat distribution structures are exposed to liquid exhaust gas purification additive. In order to avoid this, sufficient protection must therefore be provided.

Another problem with SCR dosing units is that the production costs are a very critical factor. A tank for an exhaust gas purification additive and SCR dosing unit must be provided in a motor vehicle in addition to the tank and to the delivery unit for fuel. Highly integrated, compact and very powerful SCR dosing units at low cost are therefore usually desired.

SUMMARY OF THE INVENTION

Taking this as a starting point, it is an object of the invention under consideration here to solve, or at least lessen, the technical problems discussed. In particular the intention is to present a particularly low cost and easily produced, compact SCR dosing unit with long-term stability for conveying and providing a liquid exhaust gas purification additive with a particularly effective heating system.

Such objects may be achieved by a device as set forth below. The features specified individually may be combined with one another in any desired technologically meaningful way and may be supplemented by explanatory facts from the description, with further design variants of the invention being highlighted.

The invention, in one aspect, relates to an SCR dosing pump assembly for conveying and providing a liquid exhaust gas purification additive, comprising a multi-part aluminum frame, wherein at least one PTC heating element forms an electrically conductive contact between a first part and a second part of the aluminum frame, wherein no further electrically conductive contacts exist between the first part and the second part of the aluminum frame, and the multi-part aluminum frame is molded into a plastic housing of the SCR dosing pump assembly.

The SCR dosing pump assembly or SCR delivery pump assembly can also be referred to as a pump module, for example. The described plastic housing of the SCR dosing pump assembly is a housing in which the various active components that are required for conveying and providing liquid additive from a tank are arranged. The most important of these components is a pump by which the actual conveying is performed. In addition, sensors, valves, switches, circuit boards etc., can be arranged as components in the SCR dosing pump assembly. The plastic housing of the SCR dosing pump assembly is usually arranged in a tank, in which the exhaust gas purification additive is stored. Additional intake lines from the SCR dosing unit to the tank can then be very short or even be eliminated. The PTC heating elements serve to effectively heat up liquid additive in the SCR dosing pump assembly itself or in regions within a tank which directly adjoin the SCR dosing unit. In order to transmit the heat effectively from the PTC heating elements to the exhaust gas purification additive, the aluminum frame mentioned is provided. This aluminum frame is molded directly into the plastic housing of the SCR dosing pump assembly. Here, the term "molded" is intended to mean that the plastic housing is manufactured from injection molding material and surrounds the aluminum frame at least in some section or sections. An injection molding material that is used for the plastic housing can be POM (polyoxyethylene) or HDPE (high density polyethylene), for example. The injection molded housing is preferably produced by a conventional injection molding method, in which the injection molding material is injected at high pressure into an injection mold. The aluminum frame has preferably been placed in this injection mold before the injection molding material is injected into the injection mold. This ensures that the plastic material of the plastic housing completely surrounds the aluminum frame. In particular, a strong composite structure comprising the aluminum frame and the plastic housing is formed. The plastic housing preferably surrounds the aluminum frame on both sides. In particular, the material of the plastic housing surrounds the aluminum frame on an outer side of the plastic housing. In the above description, it has already been stated that the SCR dosing unit can be arranged in a tank in which the liquid exhaust gas purification additive is stored. The fact that the material of the plastic housing completely surrounds the aluminum frame on an outer side prevents liquid exhaust gas purification additive coming into contact with the aluminum frame in the tank. The aluminum frame can also be partially exposed on an inner side of the plastic housing. This means that some area or areas of the aluminum material is/are not covered with plastic material on an inner side of the plastic housing. PTC heating elements can be in contact with the aluminum frame on the inner side of the plastic housing to enable the heat of the PTC heating elements to be transmitted to the aluminum frame. According to a preferred design variant, there is a plurality of PTC heating elements, which each form electrically conductive contacts between the first part and the second part of the aluminum frame. A design variant having two, three or four individual PTC heating elements, which are arranged in a manner as uniformly distributed as possible along a circumferential direction of plastic housing, is particularly preferred.

One special feature of the aluminum frame is that it consists of mutually separate parts, namely of a first part and a second part. The first part of the aluminum frame and the second part of the aluminum frame are insulated electrically from one another. The only electrically conductive contacts between the first part and the second part are provided by the PTC heating elements. The PTC heating elements form electrically conductive connections between the first part and the second part. This makes it possible to supply the PTC heating elements with electric current via the first part of the aluminum frame and the second part of the aluminum frame. The first part of the aluminum frame and the second part of the aluminum frame thus form electric input and output lines for the PTC heating elements. This makes it possible to ensure a uniform supply of electric current to the PTC heating elements. The electric current flows via the entire area of contact between the PTC heating elements and the first part of the aluminum frame into the PTC heating elements and via the entire area of contact between the PTC heating elements and the second part of the aluminum frame out of the PTC heating elements and vice versa. In the above description, it has been stated that the PTC material of the PTC heating elements is relatively expensive. This form of electric contact makes it possible to make full use of the PTC material. Previously, only one-sided electric contact with PTC heating elements was often the norm, wherein the electric contacts were arranged adjacent to one another on one surface of the PTC heating elements. With such electric contact, electric current flows through only part of the material of the PTC heating element. The electric contact described here allows a flow of electric current through the entire PTC heating element. This offers a special synergistic effect with the aluminum frame molded into the plastic housing because the position of the first part of the aluminum frame and of the second part of the aluminum frame can be specified in a particularly accurate manner by virtue of the molding into the plastic housing. It is thereby possible to specify extended-area contacts for the PTC heating elements on the first part of the aluminum frame and on the second part of the aluminum frame with particular precision, thus allowing permanent and reliable electric connection of PTC heating elements.

The multi-part aluminum frame is, in particular, a two-part aluminum frame having a first part and a second part. The concept of the two-part aluminum frame can be transferred as desired to aluminum frames with three or more parts. The important thing is that there are at least two parts to enable electric contact to be made with PTC heating elements via the aluminum frame. Of course, each of the two parts can be divided into two or more further parts, which may also be electrically insulated from one another.

The SCR dosing pump assembly is furthermore advantageous if the plastic housing forms a plastic wall, which has a surface, and the aluminum frame is arranged at least partially within the plastic wall, and the aluminum frame covers at least 60% of the surface of the plastic wall.

Here, the surface of the plastic wall of the plastic housing is intended to mean an imaginary surface which forms the plastic wall. The plastic housing is cylindrical in shape, for example. The surface of the plastic wall of the plastic housing is then a cylindrical circumferential surface as well as an upper cover surface and/or a lower cover surface, which is situated in the plastic wall or aligned with the plastic wall. The fact that the aluminum frame covers the surface of the plastic wall is intended to mean that a proportion of the surface of at least 60% is covered by the aluminum frame along the surface.

Such an arrangement makes it possible to distribute the heat of the PTC heating elements over a large area along the plastic wall of the plastic housing. Particularly if the SCR dosing pump assembly is arranged with the plastic housing in a tank for a liquid exhaust gas purification additive, this allows large-area transfer of the heat from the aluminum frame to the exhaust gas purification additive in the tank.

It is furthermore advantageous if the material of the plastic wall surrounds the aluminum frame on both sides, at least in some section or sections. The proportion of the surface in which the plastic material surrounds the aluminum frame on both sides is preferably a relatively large proportion of, for example, more than 50%. Here, on both sides is intended to mean that plastic material is arranged both on the outer side of the plastic wall, which faces the tank interior, and on the inner side of the plastic wall, which is oriented toward the interior of the plastic housing. The material of the plastic wall has an insulating effect. By virtue of the fact that the plastic material is arranged on both sides, it is possible to ensure that the heat introduced into the aluminum frame by the PTC heating elements is also discharged in a uniformly distributed manner on both sides of the plastic wall and that there is no disproportionate heat discharge toward the inner side.

The SCR dosing pump assembly is furthermore advantageous if the plastic housing has an upper side and a peripheral side wall, and the first part of the aluminum frame is arranged at least partially in the upper side, while the second part of the aluminum frame is arranged at least partially in the peripheral side wall. The first part of the aluminum frame is thus very largely designed in the manner of a flat surface. The second part of the aluminum frame is very largely configured in the manner of a cylindrical circumferential surface. Such a division into a first part and a second part of the aluminum frame allows particularly simple production of the aluminum frame because the aluminum frame can be produced by relatively simple deep drawing steps and bending steps. In particular, complex shaping of the aluminum frame, during which, for example, various parts of the aluminum frame have to be welded together, is not necessary.

The SCR dosing pump assembly is furthermore advantageous if the first part of the aluminum frame forms at least one extension, and the at least one PTC heating element is arranged in pocket-type openings, which are each arranged between an extension of the first part of the aluminum frame and the second part of the aluminum frame and form at least one electrically conductive contact.

Here, an extension is intended to mean a partial surface extending away from the flat surface of the first part of the aluminum frame (in particular perpendicularly). This extension forms, in particular, a surface which is parallel to the second part of the aluminum frame, at least in some section or sections. It is very easy to arrange PTC heating elements between this surface of the extension and a surface of the second part of the aluminum frame. A gap between the second part of the aluminum frame and the extension is referred to as a pocket-shaped opening, into which a PTC heating element can be inserted easily and with little outlay on production. A plurality of pocket-shaped openings for PTC heating elements is preferably formed by a plurality of extensions. As a particular preference, there are two, three or four extensions and pocket-shaped openings with PTC heating elements arranged therein. There is preferably a plurality of such pocket-shaped openings on the aluminum frame or on the SCR dosing pump assembly, the openings being distributed peripherally along the peripheral side wall. This allows particularly uniform distribution of heat on the outer side of the plastic housing of the SCR dosing pump assembly.

The SCR dosing pump assembly is furthermore advantageous if the plastic housing has a peripheral flange, in which the second part of the aluminum frame extends with a flange-shaped portion. Such a peripheral flange can be used, for example, to insert the plastic housing of the SCR dosing pump assembly into a tank bottom. To continue the aluminum frame and, in particular, the second part of the aluminum frame in this flange has the advantage that heat can also be discharged via this flange to the exhaust gas purification additive in the tank.

The SCR dosing pump assembly is furthermore advantageous if electrically insulating spacer elements are arranged between the first part and the second part of the aluminum frame, at least in some section or sections.

Electrically insulating spacer elements can be formed, on the one hand, by the plastic material of the plastic housing itself. However, there may additionally also be electrically insulating spacer elements, it being possible, for example, for such electrically insulating spacer elements to be placed in the injection mold with which the plastic housing is produced, even before injection molding material is introduced into the injection mold. Such spacer elements then allow accurate positioning of the first part and the second part in the plastic housing. Such spacer elements can also be used to protect the PTC heating elements and can be arranged in a frame shape around the PTC heating elements, for example.

The SCR dosing pump assembly is also advantageous with an electric voltage source for supplying voltage to the at least one PTC heating element, which is designed to produce an electric voltage between the first part and the second part of the aluminum frame.

A description will also be given here of a plastic tank for a liquid exhaust gas purification additive, having a tank lower side, in which an SCR dosing pump assembly described is arranged in such a way that the plastic housing of the SCR dosing pump assembly forms a tank bottom in some section or sections, wherein the plastic housing extends from the tank lower side into an interior of the plastic tank.

Arranging the SCR dosing pump assembly with the plastic housing in the tank bottom or arranging it on the tank in such a way that it forms part of the tank bottom makes it possible to effectively ensure removal of exhaust gas purification additive from the tank, irrespective of the level of the exhaust gas purification additive in the tank and, in particular also, at low levels of the exhaust gas purification additive in the tank. Moreover, accessibility of the SCR dosing pump assembly at the lower side of the tank is ensured, and therefore the servicing of active components in the SCR dosing pump assembly is also possible, for example. Here, an interior of the tank is intended to mean a different interior from the interior of the plastic housing. In a preferred design variant, the interior of the tank surrounds the outer side of the plastic housing.

A description will also be given here of a motor vehicle having an internal combustion engine, an exhaust gas treatment device for purification of the exhaust gases of the internal combustion engine, having an SCR catalytic converter for carrying out the method of selective catalytic reduction and having an SCR dosing pump assembly described for adding a liquid exhaust gas purification additive to the exhaust gas treatment device. This SCR dosing pump assembly can remove the exhaust gas purification additive from a plastic tank in which the SCR dosing pump assembly is inserted.

BRIEF DESCRIPTION OF THE DRAWINGS

The invention and the technical field of the invention will be explained in more detail below on the basis of the figures. The figures show particularly preferred exemplary embodiments of the invention, to which the invention is however not restricted. It is pointed out in particular that the figures, and in particular the dimensional relationships illustrated in the figures, are merely schematic. In the drawings:

FIG. 4: shows a schematic portion of the aluminum frame with a PTC heating element;

FIG. 5: shows a second schematic portion of the aluminum frame with a PTC heating element; and FIG. 6: shows a motor vehicle.

DETAILED DESCRIPTION OF THE PRESENTLY PREFERRED EMBODIMENTS

Figure 1:
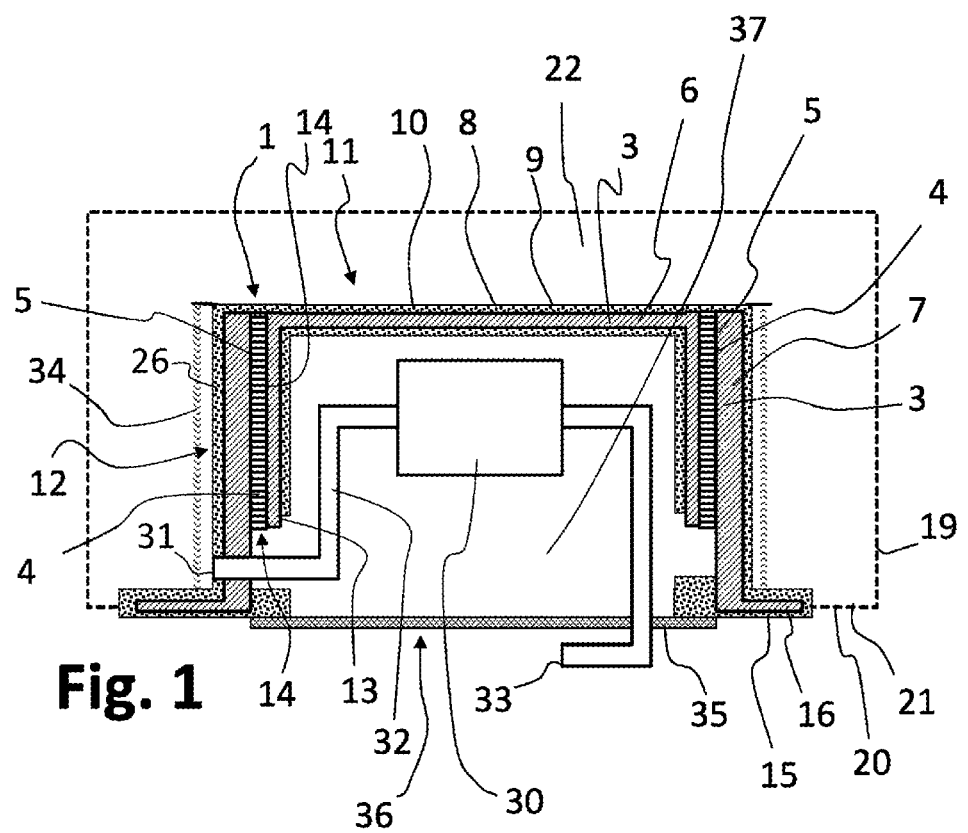
FIG. 1: shows a schematic plastic tank with an SCR dosing pump assembly described.

FIG. 1 shows a plastic tank 19 with a tank lower side 20, which is formed by a tank bottom 21 (illustrated schematically here) and in which an SCR dosing pump assembly 1 is inserted which has the construction described here. This SCR dosing pump assembly 1 has a plastic housing 8, into which an aluminum frame 3 is inserted. This aluminum frame 3 has a first part 6 and a second part 7. The first part 6 of the aluminum frame is arranged in an upper side 11 of the plastic housing 8. The second part of the aluminum frame is arranged predominantly in a peripheral side wall 12 of the plastic housing 8. The plastic housing 8 has a plastic wall 9, which has a surface 10. PTC heating elements 4, which form electrically conductive contacts 5 between the first part 6 and the second part 7 of the aluminum frame 3, are arranged between the first part 6 and the second part 7 of the aluminum frame 3. The space between the first part 6 and the second part 7, in which the PTC heating elements 4 are arranged, can also be regarded as a pocket-shaped opening 14. To form the pocket-shaped openings 14, the first part 6 of the aluminum frame forms extensions 13, which extend parallel to the second part 7 of the aluminum frame.

The plastic housing 8 of the SCR dosing pump assembly 1 has a peripheral flange 15, by which it is inserted into the tank bottom 21. The peripheral flange 15 forms, a connection region of the plastic housing 8 with respect to a tank bottom 21. In the peripheral flange 15 there is a flange-shaped portion 16 of the second part 7 of the aluminum frame 3. This flange-shaped portion 16 allows heat distribution via the flange 15. As a whole, the plastic housing 8 forms an inverted insert into an interior 22 of the plastic tank 19, said insert starting from the tank bottom 21. A filter 34 is also arranged peripherally on the outside of the plastic housing 8 of the SCR dosing pump assembly. The filter 34 surrounds the plastic housing 8 at the periphery. Liquid exhaust gas purification additive in the plastic tank 19 can be drawn through the filter 34 to an intake point 31, at which the liquid exhaust gas purification additive is removed from the tank. Arranged in the plastic housing 8 is a pump 30, which draws the liquid exhaust gas purification additive from the intake point 31 via a suction line 32 and conveys it to a supply connection 33, at which the exhaust gas purification additive is made available. On a housing inner side 36, which is arranged opposite the upper side 11 and faces outward, the plastic housing 8 is closed by a cover 35, with the result that a closed space 37 is formed for the components of the SCR dosing pump assembly 1 (especially for a pump 30).

Figure 2:
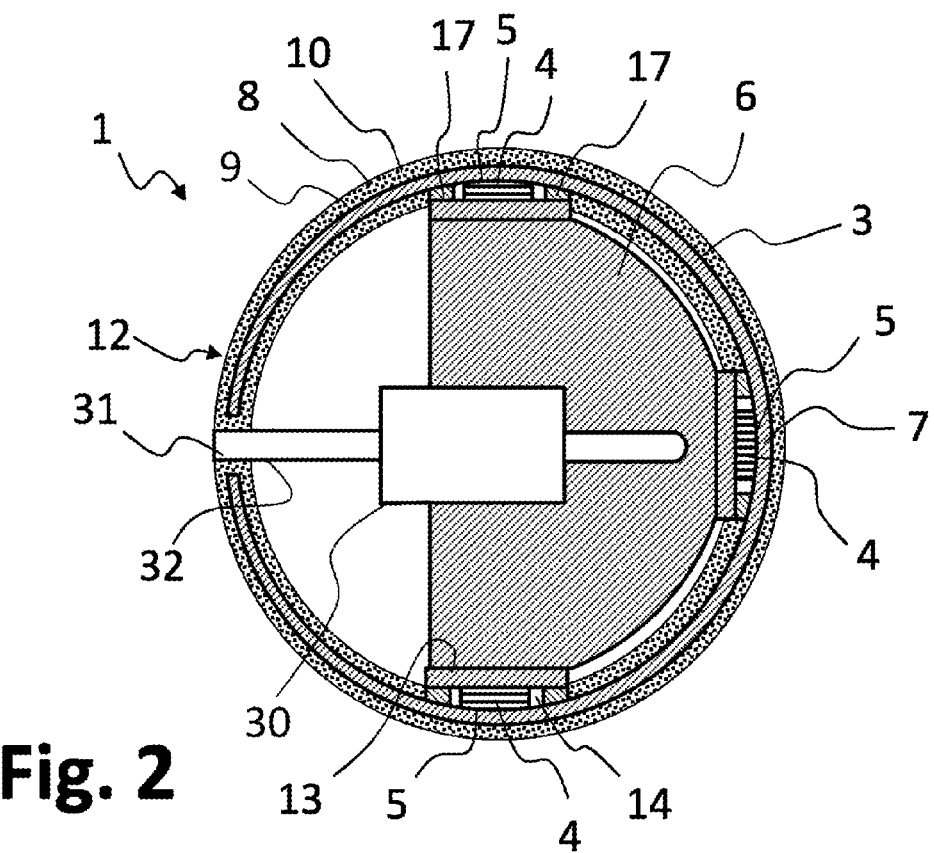
FIG. 2: shows a section through an SCR dosing pump assembly described.

FIG. 2 shows a section through the SCR dosing pump assembly 1 and the plastic housing 8. It can be seen how the plastic wall 9 of the plastic housing 8 forms a circumferential surface. The second part 7 of the aluminum frame 3 is arranged in this peripheral side wall 12 of the plastic housing. From below, it is also possible to see a portion of the first part of the aluminum frame 3 which is not covered here by the plastic material of the plastic housing 8, the portion having extensions 13 which extend parallel to the second part of the aluminum frame and form pockets-type openings 14, in which PTC heating elements are arranged and form electric contacts 5 between the first part 6 and the second part 7 of the aluminum frame. The intake point 31 (likewise illustrated in FIG. 1), the suction line 32 and the pump 30 can likewise be seen. It can be seen that a total of three PTC heating elements 4 is arranged here in pocket-shaped openings 14 along the peripheral side wall 12. Likewise illustrated are spacer elements 17, which ensure a spacing between the first part 6 and the second part 7 of the aluminum frame.

Figure 3:
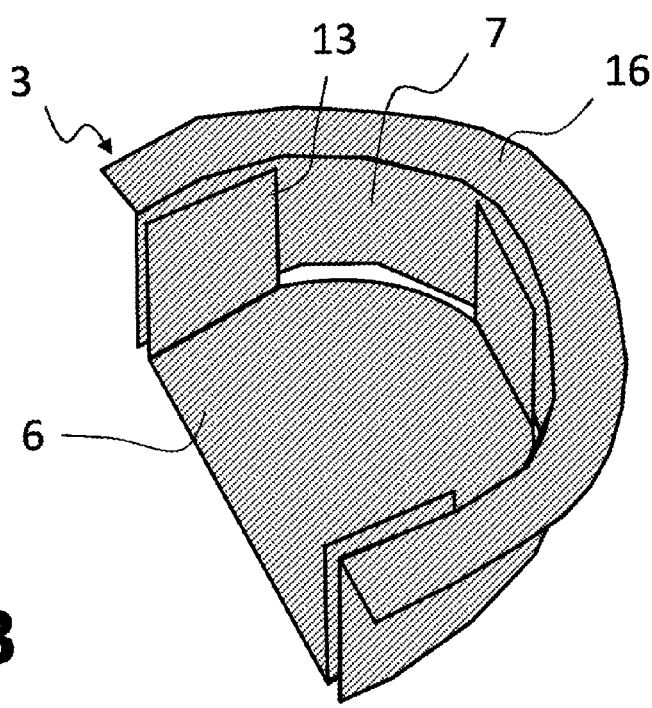
FIG. 3: shows a three-dimensional schematic illustration of the aluminum frame.

For better spatial orientation of the aluminum frame, the aluminum frame 3 is shown once again schematically in a three-dimensional illustration in FIG. 3, without further structural elements of the SCR dosing pump assembly. The first part 6 and the second part 7 can be seen, wherein the first part 6 forms extensions 13 and the second part 7 forms the flange-shaped portion 16. The material of the plastic housing (not illustrated here) surrounds both parts of the aluminum frame.

FIGS. 4 and 5 each illustrate a portion of the aluminum frame 3 with the first part 6 and the second part 7 and a PTC heating element 4 arranged therebetween, which forms the electric contact 5 between the first part 6 and the second part 7. The first part 6 and the second part 7 are each connected to a voltage source 18 via electric contacts 29 in order to transmit electric current to the PTC heating element 4. FIG. 4 additionally shows spacer elements 17, which maintain a spacing between the first part 6 and the second part 7 of the aluminum frame 3.

FIG. 6 shows a motor vehicle 23 having an internal combustion engine 24 and an exhaust gas treatment device 25 with an SCR catalytic converter 26 for the purification of the exhaust gases of the internal combustion engine 24. The exhaust gas treatment device 25 can be supplied with liquid exhaust gas purification additive 2 from a plastic tank 19 having an SCR dosing pump assembly 1. For this purpose, the SCR dosing unit 1 is connected via a line 27 to an injector 28 on the exhaust gas treatment device 25.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations.

The invention claimed is:

1. A selective catalytic reduction (SCR) dosing pump assembly (1) configured to convey and provide a liquid exhaust gas purification additive (2), comprising:
   a plastic housing (8);
   a multi-part aluminum frame (3) having first part (6) and a second part (7); and
   at least one positive temperature coefficient (PTC) heating element (4) configured as an electrically conductive contact (5) between the first part (6) and the second part (7) of the aluminum frame (3), wherein:
no further electrically conductive contacts exist between the first part (6) and the second part (7) of the aluminum frame (3), and
the multi-part aluminum frame (3) is molded into the plastic housing (8) of the SCR dosing pump assembly (1).

2. The SCR dosing pump assembly (1) as claimed in claim 1, wherein the plastic housing (8) defines a plastic wall (9), which has a surface (10), and the aluminum frame (3) is arranged at least partially within the plastic wall (9), and the aluminum frame (3) covers at least 60% of the surface (10) of the plastic wall (9).

3. The SCR dosing pump assembly (1) as claimed in claim 2, wherein material of the plastic wall (9) surrounds the aluminum frame (3) on both sides, at least in some section or sections.

4. The SCR dosing pump assembly (1) as claimed in claim 1, wherein the plastic housing (8) has an upper side (11) and a peripheral side wall (12), and the first part (6) of the aluminum frame (3) is arranged at least partially in the upper side (11), and the second part (7) of the aluminum frame (3) is arranged at least partially in the peripheral side wall (12).

5. The SCR dosing pump assembly (1) as claimed in claim 4, wherein the first part (6) of the aluminum frame (3) has at least one extension (13), and the at least one PTC heating element (4) is arranged in pocket-type openings (14), each arranged between the at least one extension (13) of the first part (6) of the aluminum frame (3) and the second part (7) of the aluminum frame (3) and form at least one electrically conductive contact (5).

6. The SCR dosing pump assembly (1) as claimed in claim 5, wherein the plastic housing (8) has a peripheral flange (15), in which the second part (7) of the aluminum frame (3) is continued with a flange-shaped portion (16).

7. The SCR dosing pump assembly (1) as claimed in claim 1, further comprising electrically insulating spacer elements (17) arranged between the first part (6) and the second part (7) of the aluminum frame (3), at least in some section or sections.

8. The SCR dosing pump assembly (1) as claimed in claim 1, further comprising an electric voltage source (18) configured to supply voltage to the at least one PTC heating element (4), by producing an electric voltage between the first part (6) and the second part (7) of the aluminum frame (3).

9. A plastic tank (19) for a liquid exhaust gas purification additive, having a tank lower side (20), in which the SCR dosing pump assembly (1) as claimed in claim 1 is arranged such that the plastic housing (8) of the SCR dosing pump assembly (1) forms a tank bottom (21) in some section or sections, wherein the plastic housing (8) extends from the tank lower side (20) into an interior (22) of the plastic tank (19).

10. A motor vehicle (23) comprising:
an internal combustion engine (24);
an exhaust gas treatment device (25) configured to purify exhaust gases of the internal combustion engine (24); and
an SCR catalytic converter (26) configured to carry out selective catalytic reduction, the SCR catalytic converter (26) having the SCR dosing pump assembly (1) as claimed in claim 1 for adding the liquid exhaust gas purification additive (2) to the exhaust gas treatment device (25).

* * * * *